US008966773B2

(12) United States Patent
Gregorich

(10) Patent No.: US 8,966,773 B2
(45) Date of Patent: Mar. 3, 2015

(54) POWER TOOL INCLUDING AN ANTI-VIBRATION HANDLE

(75) Inventor: Brent Gregorich, Anderson, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 333 days.

(21) Appl. No.: 13/542,740

(22) Filed: Jul. 6, 2012

(65) Prior Publication Data

US 2014/0007436 A1 Jan. 9, 2014

(51) Int. Cl.
*B25F 5/02* (2006.01)
*B23D 49/16* (2006.01)

(52) U.S. Cl.
USPC .......................................... 30/392; 173/162.2

(58) Field of Classification Search
CPC .................................. B25F 5/02; B23D 49/16
USPC .......................................... 30/392; 173/162.2
See application file for complete search history.

(56) References Cited

U.S. PATENT DOCUMENTS 2,725,692 A 12/1955 Andreae
3,637,029 A 1/1972 Sherwood, Jr. et al.
3,652,074 A 3/1972 Frederickson et al.
3,728,793 A * 4/1973 Makinson et al. .............. 30/383
3,813,776 A 6/1974 Frederickson et al.
3,824,417 A 7/1974 Moores, Jr.
3,845,557 A 11/1974 Bailey
3,916,478 A 11/1975 Shotwell
3,945,119 A 3/1976 Nagashima et al.
3,968,843 A 7/1976 Shotwell
4,041,606 A 8/1977 Thompson
4,138,812 A 2/1979 Zimmerer et al.
4,141,143 A 2/1979 Hirschkoff et al.
4,198,752 A 4/1980 Bross
4,282,938 A 8/1981 Minamidate
4,469,316 A 9/1984 van den Boom et al.
4,611,671 A 9/1986 Hansson
4,638,562 A 1/1987 Drake
4,648,468 A 3/1987 Honsa
4,667,749 A 5/1987 Keller
4,670,985 A 6/1987 Biersteker
4,711,308 A 12/1987 Blaas et al.
4,749,049 A * 6/1988 Greppmair ................ 173/162.2
4,771,833 A 9/1988 Honsa
4,800,965 A 1/1989 Keller
4,819,742 A 4/1989 Driggers
4,876,797 A 10/1989 Zapata
4,896,426 A 1/1990 Nagashima
4,921,053 A 5/1990 Dobry et al.
4,936,394 A 6/1990 Ohtsu
4,972,733 A 11/1990 Olmr et al.
4,995,598 A 2/1991 Ingham
5,016,355 A 5/1991 Gassen et al.
5,025,870 A 6/1991 Gantner
5,031,273 A 7/1991 Yamaguchi
5,038,480 A 8/1991 Naslund
5,046,566 A 9/1991 Dorner et al.
(Continued)

*Primary Examiner* — Hwei C Payer
(74) *Attorney, Agent, or Firm* — Michael Best & Friedrich LLP

(57) ABSTRACT

A power tool includes a tool operable to work on a workpiece, a drive mechanism coupled to the tool and operable to move the tool, and a housing defining an interior. The drive mechanism is disposed within the interior. A handle has a first end and a second end. The first end is fixed to the housing and the second end is spaced apart from the housing to define a gap therebetween. An insert is fixedly attached to the housing and the second end to fill the gap. The insert is more flexible then the handle and the housing.

17 Claims, 5 Drawing Sheets

(56) References Cited

U.S. PATENT DOCUMENTS

| | | | | | |
|---|---|---|---|---|---|
| 5,052,500 | A * | 10/1991 | Ohtsu | ........................ | 173/162.2 |
| 5,054,562 | A | 10/1991 | Honsa et al. | | |
| 5,157,807 | A | 10/1992 | Keller et al. | | |
| 5,170,532 | A | 12/1992 | Holmin et al. | | |
| 5,213,167 | A | 5/1993 | Best et al. | | |
| 5,267,487 | A | 12/1993 | Falco et al. | | |
| 5,273,120 | A | 12/1993 | Chang | | |
| 5,322,131 | A | 6/1994 | Pressley et al. | | |
| 5,365,637 | A | 11/1994 | Bodell et al. | | |
| 5,368,107 | A | 11/1994 | Taomo | | |
| 5,400,860 | A | 3/1995 | Best et al. | | |
| 5,447,295 | A | 9/1995 | Taomo | | |
| 5,453,577 | A | 9/1995 | Everett et al. | | |
| 5,522,466 | A | 6/1996 | Harada et al. | | |
| 5,692,574 | A | 12/1997 | Terada | | |
| 5,697,456 | A | 12/1997 | Radle et al. | | |
| 5,699,865 | A | 12/1997 | Forderer et al. | | |
| 5,813,477 | A | 9/1998 | Clay et al. | | |
| 5,839,517 | A | 11/1998 | Gwinn et al. | | |
| 5,881,822 | A | 3/1999 | Sienkiewycz et al. | | |
| 5,927,407 | A | 7/1999 | Gwinn et al. | | |
| 5,975,862 | A | 11/1999 | Arahata et al. | | |
| 6,082,468 | A | 7/2000 | Pusateri et al. | | |
| 6,155,354 | A | 12/2000 | Pusateri et al. | | |
| 6,155,916 | A | 12/2000 | Rudolf et al. | | |
| 6,220,367 | B1 | 4/2001 | Masterson et al. | | |
| 6,286,610 | B1 | 9/2001 | Berger et al. | | |
| 6,311,369 | B1 | 11/2001 | Ryu | | |
| 6,412,180 | B1 | 7/2002 | Wolf et al. | | |
| 6,446,421 | B1 | 9/2002 | Kramer et al. | | |
| 6,464,572 | B2 | 10/2002 | Jansson | | |
| 6,619,409 | B2 | 9/2003 | Iida | | |
| 6,643,939 | B2 | 11/2003 | Tajima et al. | | |
| 6,796,389 | B2 | 9/2004 | Pusateri et al. | | |
| 6,799,373 | B2 | 10/2004 | Menzel et al. | | |
| 6,962,211 | B2 | 11/2005 | Daubner et al. | | |
| 6,994,068 | B2 | 2/2006 | Menzel et al. | | |
| 7,021,399 | B2 | 4/2006 | Driessen | | |
| 7,021,401 | B2 | 4/2006 | Droste et al. | | |
| 7,032,688 | B2 | 4/2006 | Kirsch | | |
| 7,039,986 | B2 | 5/2006 | Glenn et al. | | |
| 7,070,009 | B2 | 7/2006 | Kawamoto et al. | | |
| 7,076,838 | B2 | 7/2006 | Meixner | | |
| 7,100,706 | B2 | 9/2006 | Meixner et al. | | |
| 7,104,873 | B1 | 9/2006 | Borinato et al. | | |
| 7,137,542 | B2 | 11/2006 | Oki et al. | | |
| 7,175,456 | B2 | 2/2007 | Moreno et al. | | |
| 7,185,998 | B2 | 3/2007 | Oomori et al. | | |
| 7,204,744 | B2 | 4/2007 | Lamprecht et al. | | |
| 7,219,433 | B2 | 5/2007 | Gorenflo et al. | | |
| 7,246,797 | B2 | 7/2007 | Gustavsson | | |
| 7,252,156 | B2 | 8/2007 | Sugiyama et al. | | |
| 7,287,601 | B2 | 10/2007 | Hellbach et al. | | |
| 7,320,369 | B2 | 1/2008 | Stirm et al. | | |
| 7,322,428 | B2 | 1/2008 | Bacila | | |
| 7,413,030 | B2 | 8/2008 | Chen et al. | | |
| 7,472,760 | B2 | 1/2009 | Stirm et al. | | |
| 7,496,989 | B2 | 3/2009 | Walker et al. | | |
| 7,513,317 | B2 | 4/2009 | Satou | | |
| 7,523,790 | B2 | 4/2009 | Arakawa et al. | | |
| 7,565,934 | B2 | 7/2009 | Chen et al. | | |
| 7,604,071 | B2 | 10/2009 | Ikuta | | |
| 7,610,967 | B2 | 11/2009 | Fischer et al. | | |
| 7,624,815 | B2 | 12/2009 | Friedrich et al. | | |
| 7,625,228 | B2 | 12/2009 | Doumani | | |
| 7,637,328 | B2 | 12/2009 | Sato | | |
| 7,669,290 | B2 | 3/2010 | Oddo et al. | | |
| 7,673,703 | B2 | 3/2010 | Fischer et al. | | |
| 7,676,890 | B2 | 3/2010 | Zhang et al. | | |
| 7,721,390 | B2 | 5/2010 | Pfeiffer et al. | | |
| 7,721,818 | B2 | 5/2010 | Inagawa et al. | | |
| 7,762,348 | B2 | 7/2010 | Stirm et al. | | |
| 8,316,957 | B2 * | 11/2012 | Kuhnle et al. | .............. | 173/162.2 |
| 8,403,076 | B2 * | 3/2013 | Iwakami | .................... | 173/162.1 |
| 8,522,894 | B2 * | 9/2013 | Kraenzler et al. | ......... | 173/162.1 |
| 8,672,305 | B2 * | 3/2014 | Wolf et al. | ................. | 267/141.2 |
| 8,714,280 | B2 * | 5/2014 | Moreno et al. | ............. | 173/162.2 |
| 2003/0037937 | A1 * | 2/2003 | Frauhammer et al. | .......... | 173/48 |
| 2003/0188618 | A1 | 10/2003 | Menzel et al. | | |
| 2004/0016082 | A1 | 1/2004 | Yi | | |
| 2004/0078936 | A1 | 4/2004 | Walker et al. | | |
| 2006/0113098 | A1 | 6/2006 | Inagawa et al. | | |
| 2006/0166613 | A1 | 7/2006 | Lamprecht et al. | | |
| 2006/0207063 | A1 | 9/2006 | Jaszkowiak et al. | | |
| 2006/0219418 | A1 * | 10/2006 | Arakawa et al. | ........... | 173/162.2 |
| 2007/0034397 | A1 | 2/2007 | Fischer et al. | | |
| 2007/0089274 | A1 | 4/2007 | Zhang et al. | | |
| 2007/0143966 | A1 | 6/2007 | Fischer | | |
| 2007/0151074 | A1 | 7/2007 | Whiteman, Jr. et al. | | |
| 2007/0289763 | A1 | 12/2007 | Wiker et al. | | |
| 2008/0000664 | A1 | 1/2008 | Steinke | | |
| 2008/0041603 | A1 | 2/2008 | Wiker et al. | | |
| 2008/0099222 | A1 | 5/2008 | Ranger et al. | | |
| 2008/0190631 | A1 | 8/2008 | Lemmel et al. | | |
| 2008/0289842 | A1 | 11/2008 | Chapple et al. | | |
| 2009/0049651 | A1 | 2/2009 | Roberts et al. | | |
| 2009/0307875 | A1 | 12/2009 | Nakashima et al. | | |
| 2010/0012339 | A1 | 1/2010 | Hahn et al. | | |
| 2010/0167632 | A1 | 7/2010 | Roehm | | |
| 2010/0193209 | A1 * | 8/2010 | Schadow et al. | ........... | 173/162.2 |
| 2010/0206596 | A1 | 8/2010 | Kamegai et al. | | |
| 2010/0223760 | A1 | 9/2010 | Henke et al. | | |
| 2011/0011608 | A1 * | 1/2011 | Saur | ........................... | 173/162.2 |

* cited by examiner

POWER TOOL INCLUDING AN ANTI-VIBRATION HANDLE

BACKGROUND

The present invention relates to anti-vibration handles. More specifically, the present invention relates to anti-vibration handles for use with power tools such as reciprocating saws.

Power tools often produce vibrations during use. These vibrations can be caused by the operation of the saw as well as the interaction with the tool and the work piece. The vibrations can pass through the power tool to the handle or handles and ultimately to the users hands. The vibrations can cause fatigue or a reduced grip on the power tool making its use less efficient and more difficult.

SUMMARY

In one construction, the invention provides a power tool that includes a tool operable to work on a workpiece, a drive mechanism coupled to the tool and operable to move the tool, and a housing defining an interior. The drive mechanism is disposed within the interior. A handle has a first end and a second end. The first end is fixed to the housing and the second end is spaced apart from the housing to define a gap therebetween. An insert is fixedly attached to the housing and the second end to fill the gap. The insert is more flexible than the handle and the housing.

In another construction, the invention provides a power tool that includes a tool operable to work on a workpiece, a motor coupled to the tool and operable to move the tool, a first housing, and a second housing coupled to the first housing to define an interior space. The motor is disposed within the interior space. A handle includes a first end fixedly attached to the first housing and a second end spaced apart from the first housing. An insert is fixedly attached to the first housing and the second end. The insert includes a first plurality of corrugations.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The present invention provides a power tool 10 that includes an anti-vibration handle 15. While the invention is illustrated as applied to a battery powered reciprocating saw, the invention could be applied to conventionally powered (AC) reciprocating saws as well as other power tools that are battery powered or conventionally powered.

Figure 1:
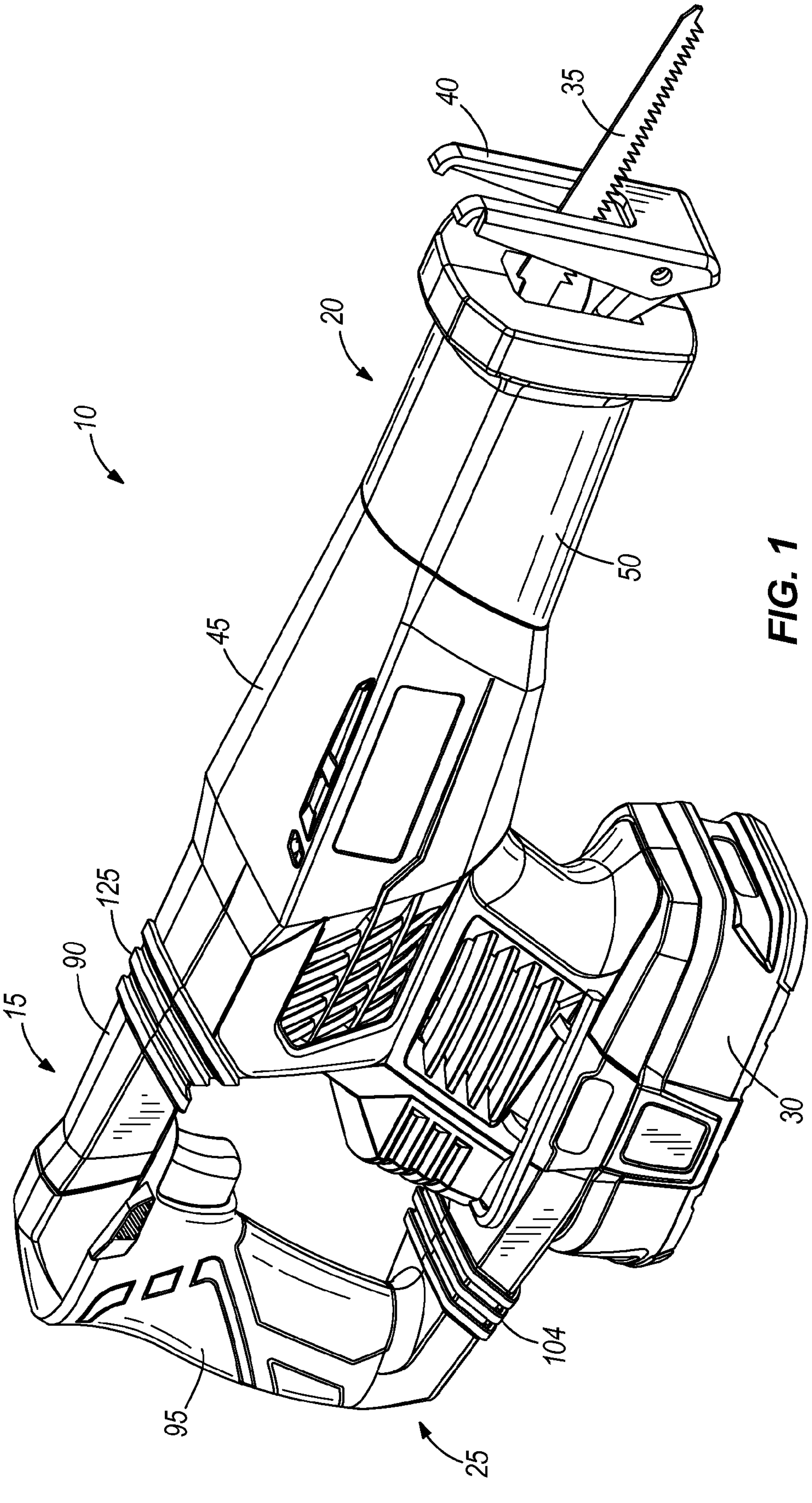
FIG. 1 is a perspective view of a power tool including an anti-vibration handle according to the invention.

FIG. 1 illustrates the power tool 10 in the form of a reciprocating saw. The saw 10 includes a housing 20 and a handle 25 that extends from the rear of the housing 20. The illustrated saw 10 is battery powered and therefore includes a removable battery pack 30 that attaches to the housing 20. A cutting tool 35 in the form of a saw blade extends from one end of the housing 20 and is positioned adjacent a shoe 40. During use, a user grasps the housing 20 in one hand and the handle 25 in the other. The shoe 40 is arranged to engage a workpiece while the saw blade 35 reciprocates to cut the workpiece.

In preferred constructions, the housing 20 is formed from a first housing portion 45 and a second housing portion 50 that attach to one another to complete the housing 20. In other constructions, other arrangements or arrangements with more than two housing portions are employed.

Figure 2:
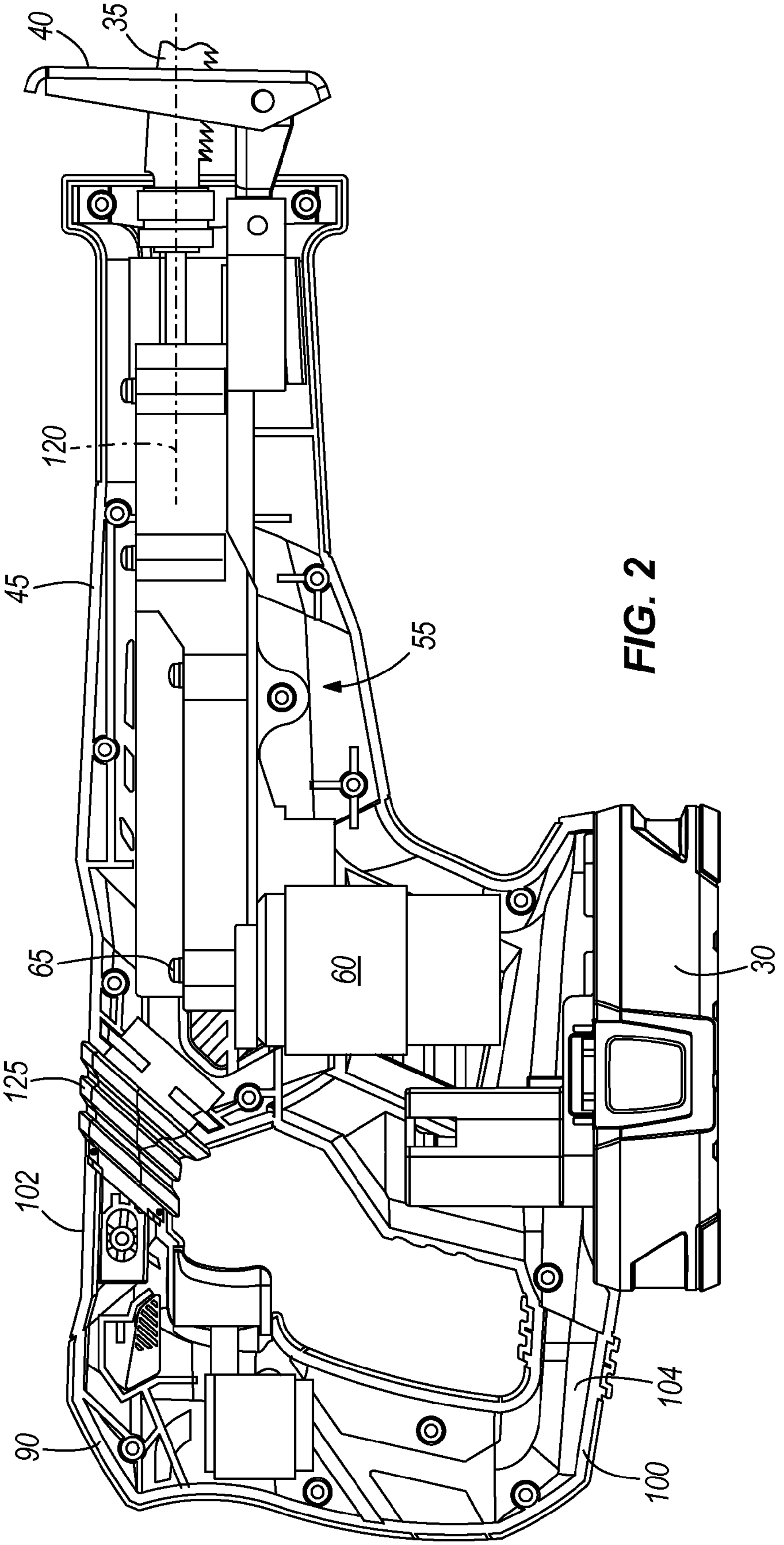
FIG. 2 is a side view of an interior portion of one half of a power tool housing having an insert positioned therein.
Figure 3:
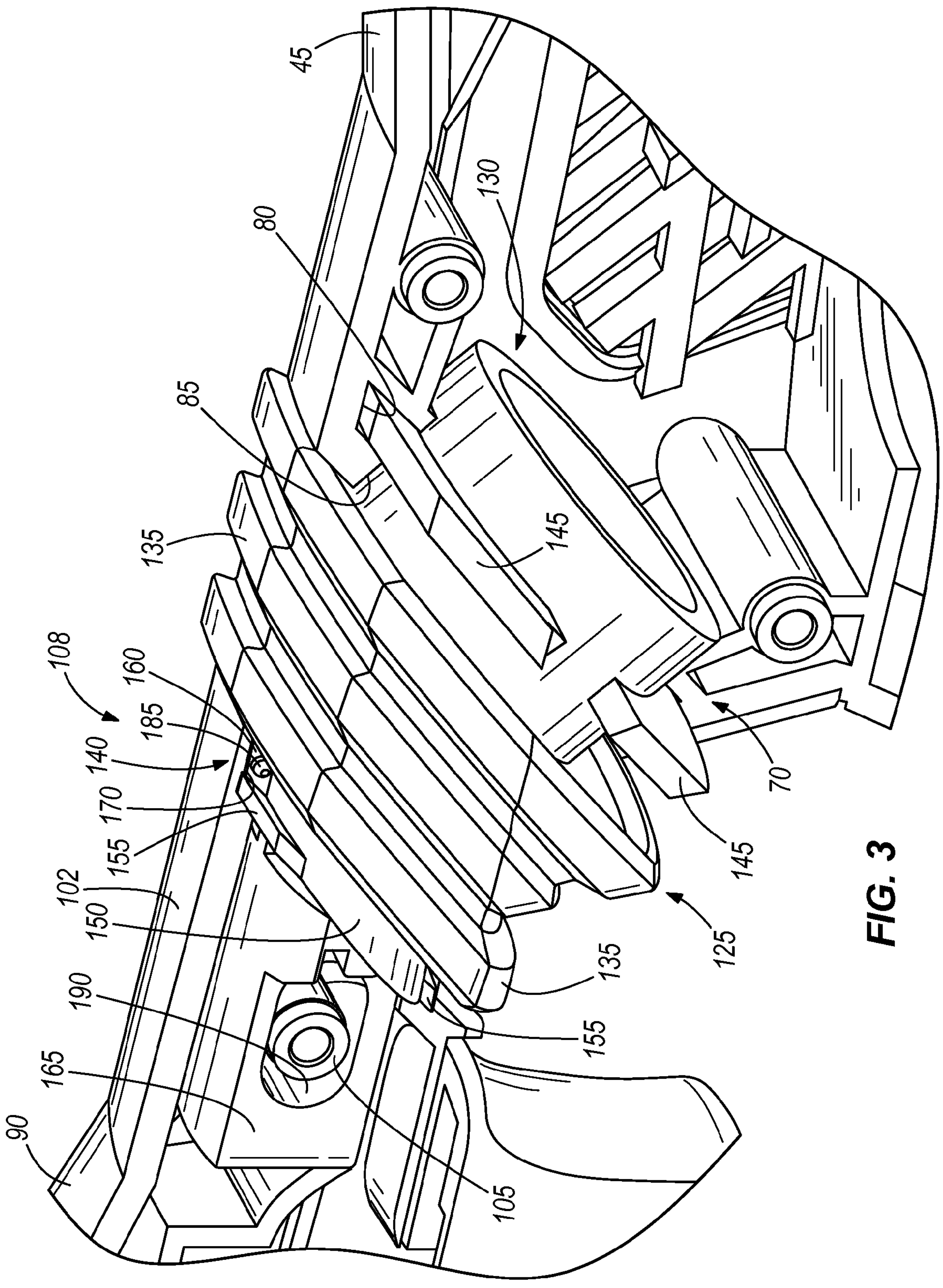
FIG. 3 is an enlarged perspective view of a portion of the housing of FIG. 2 better illustrating the insert.

FIG. 2 illustrates the first housing portion 45 with the second housing portion 50 removed. As can be seen, the first housing portion 45 and the second housing portion 50 cooperate to define an interior 55 that contains a motor 60 and a linkage or mechanism 65 that interconnects the motor 60 and the tool 35. It should be noted that in some constructions, the first housing portion 45 and the second housing portion 50 are substantial mirror images of one another. In other constructions, the second housing portion and the first housing portion are different from one another. The construction illustrated and described herein includes two housing portions 45, 50 that are substantial mirror images of one another. As such, the terms first housing portion 45, second housing portion 50, and housing 20 can be used largely interchangeably.

Figure 4:
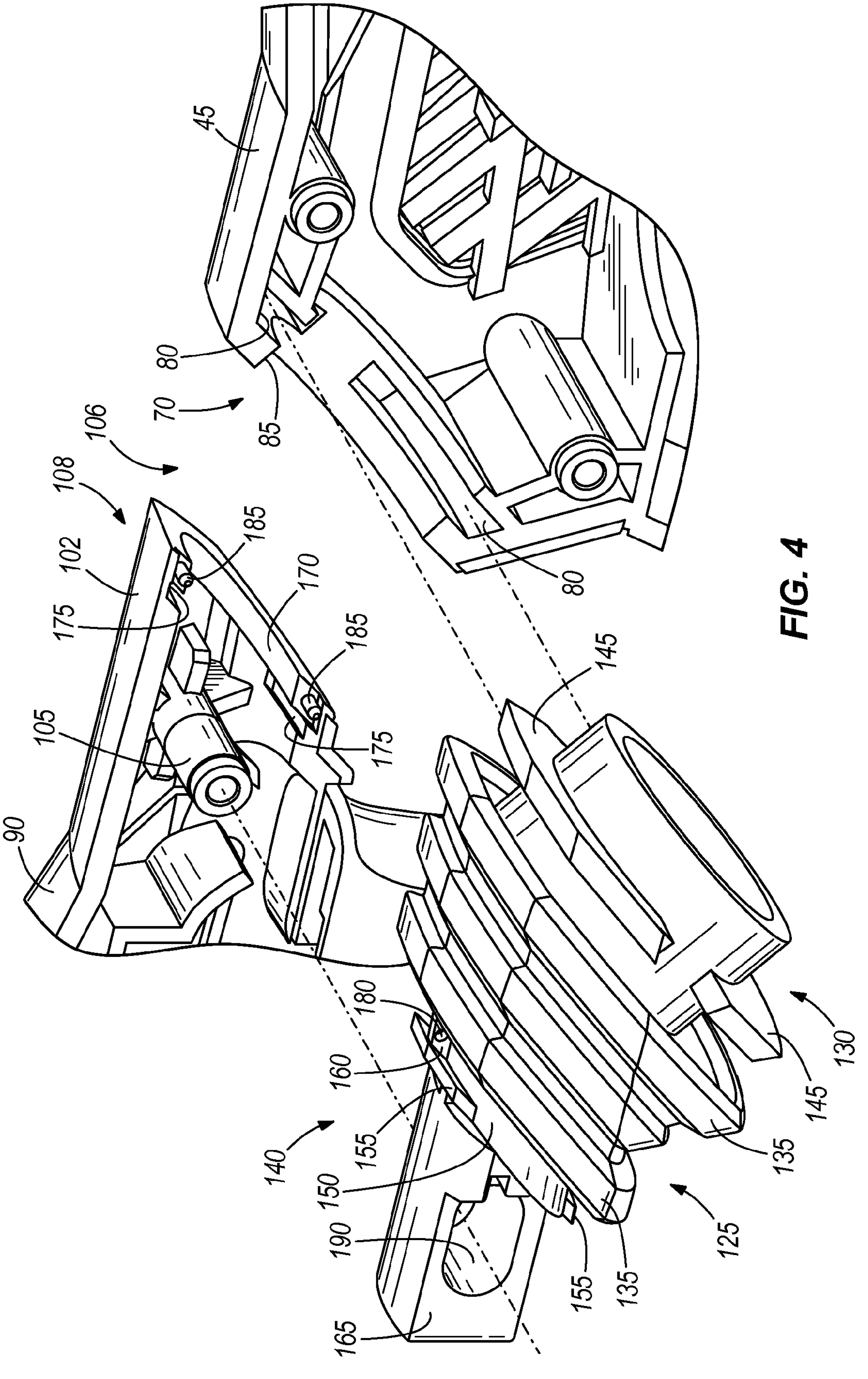
FIG. 4 is an exploded view of the portion of the housing and the insert of FIG. 3.

The first housing portion 45 includes a first engaging portion 70 that is best illustrated in FIG. 4. The first engaging portion 70 includes a pair of slots 80 that extend circumferentially around at least a portion of an opening 85 in the housing 20. FIG. 4 illustrates the slots 80 in the first housing portion 45 with the second housing portion 50 including similarly arranged slots 80.

The handle 25 is preferably formed from a first handle portion 90 and a second handle portion 95 in a manner similar to that of the housing 20. FIG. 2 illustrates the first handle portion 90 of the handle 25 with the second handle portion 95 removed. The handle portions 90, 95 are arranged such that when assembled, they cooperate to define the D-shaped handle 25. Of course other handle shapes and arrangements are possible.

The handle 25 includes a first end 100 and a second end 102 opposite the first end 100. The first end 100 is fixedly attached to the housing 20 such that any relative movement therebetween is a result of material flexing and resilience. In a preferred arrangement, the first handle portion 90 is formed as part of the first housing portion 45 and the second handle portion 95 is formed as part of the second housing portion 50. A series of corrugations 104 are formed at the interface between the first end of the handle 100 and the housing 20 to increase the flexibility and relative movement available between the handle 25 and the housing 20 at the first end of the handle 100.

The second end of the handle 102 is opposite the first end 100 and is spaced apart from the housing 20 to define a gap 106 therebetween. The second end of the handle 102 includes a projection 105 that is part of a second engaging portion 108. In the illustrated construction, the projection 105 is cylindrical and extends in a direction that is substantially normal to an axis of reciprocation 120 of the saw blade 35. The second engaging portion 108 includes a cylindrical aperture 170, engaging slots 175, and a pair of pins 185.

Figure 5:
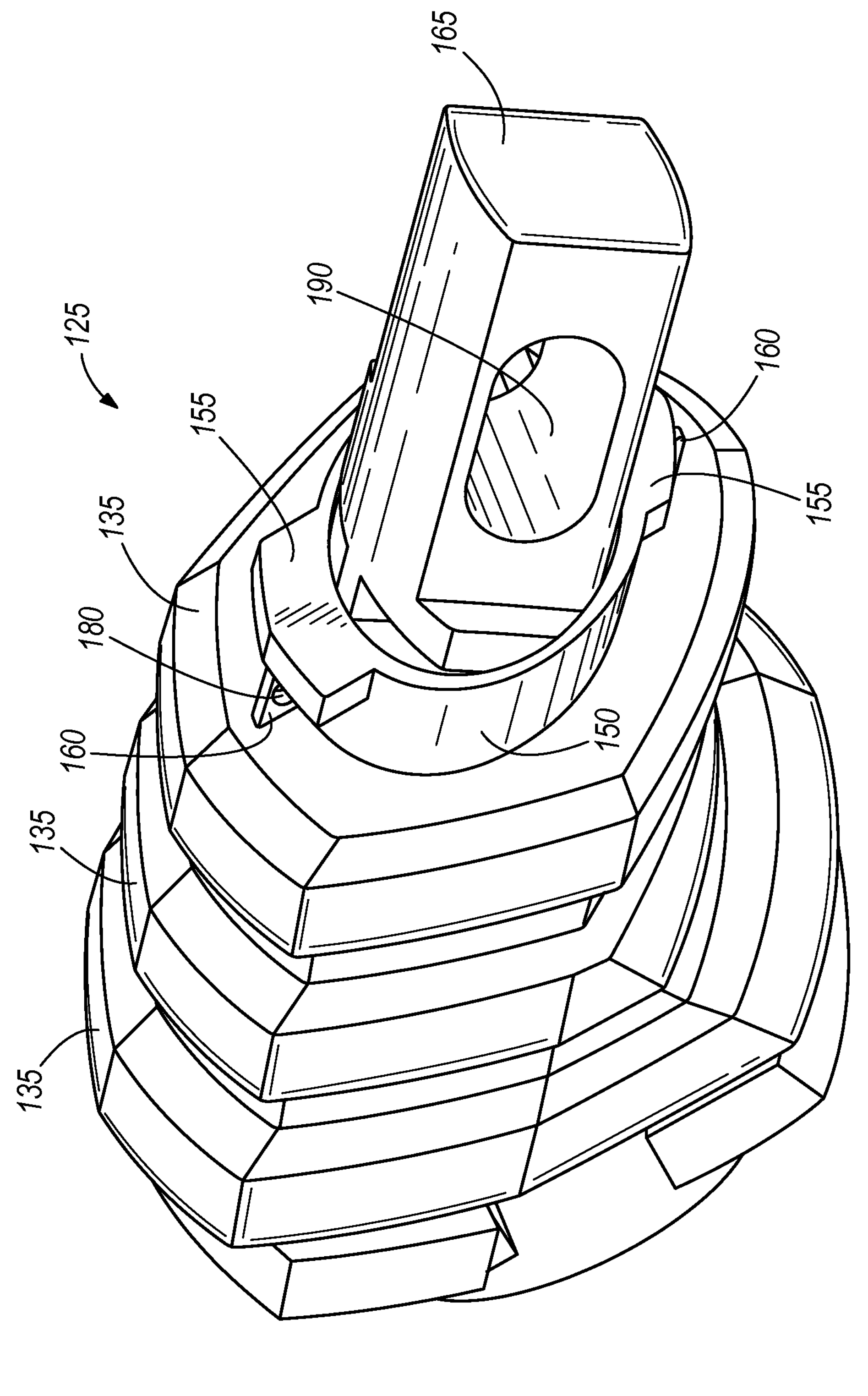
FIG. 5 is a perspective view of the insert of FIGS. 2-4.

An insert 125 engages the housing 20 at the first engaging portion 70 and engages the handle 25 at the second engaging portion 108 to fill in the gap 106 between the second end of the handle 102 and the housing 20. As illustrated in FIGS. 4 and 5, the insert 125 includes a third engaging portion 130, a plurality of corrugations 135, and a fourth engaging portion 140. The third engaging portion 130 includes a pair of ribs 145 that are sized and shaped to be received within the slots 80 of the first engaging portion 70. In other constructions, the first engaging portion includes ribs and the third engaging portion includes slots. In still other constructions, other shapes and mechanisms are used to couple the insert 125 to the housing 20. The shape or arrangement is not critical so long as the first engaging portion 70 and the third engaging portion 130 cooperate to fixedly attach the insert 125 to the housing 20.

In the illustrated construction, three corrugations 135 are provided between the fourth engaging portion 140 and the third engaging portion 130 to increase the flexibility of the insert 125. The corrugations 135 are disposed within the gap 106 and allow for axial expansion as well as twisting motions between the handle 25 and the housing 20. In addition, the corrugations 135 assist in dissipating vibrations produced in the housing 20 such that the vibration amplitude is reduced as it passes to the handle 25.

The fourth engaging portion 140 extends from the corrugations 135 in a direction substantially opposite the third engaging portion 130 and includes an extension 150, a pair of ribs 155, a pair of gussets 160, and a boss 165. The extension 150 includes a cylindrical portion that is sized to fit within the cylindrical aperture 170 of the handle 25 to inhibit the unwanted entry of dirt, dust, or debris into the handle 25. The ribs 155 are size and shaped to engage the slots 175 formed in the handle 25. The gussets 160 each include an aperture 180 that is sized to receive one of the pins 185 positioned adjacent the cylindrical aperture 170 of the handle 25. The boss 165 extends in a direction that is substantially parallel to the reciprocation axis 120 and includes a slot 190 having a long axis that extends along the same axis. The slot 190 is sized to receive the projection 105 while still allowing movement of the projection 105 with respect to the boss 165.

In preferred constructions, the handle 25 and the housing 20 are formed from a plastic material. In some constructions, a softer material may be positioned over all or portions of the housing 20 and the handle 25 to improve the grip of a user. In still other arrangements, these softer portions may be overmolded over portions of the housing 20 or the handle 25. The insert 125 is preferably formed from a material that is more flexible and/or softer than the housing 20 and the handle 25. For example, some constructions employ a rubber-like material to form the insert 125.

To assemble the handle 25 and the housing 20, the first handle portion 90 and the first housing portion 45 are preferably molded as a single piece with the gap 106 positioned between the second end of the handle 102 and the housing 20. The second handle portion 95 and the second housing portion 50 are molded in a similar fashion. The insert 125 is positioned within the first housing portion 45 and the handle 25, 90 such that the first engaging portion 70 engages the third engaging portion 130. The fourth engaging portion 140 is then engaged with the second engaging portion 108 of the handle 25, 90 by engaging the gusset apertures 180 with the pins 185, engaging the ribs 155 with the slots 175, and positioning the projection 105 within the slot 190 of the boss 165. In this position, the corrugations 135 of the insert 125 are disposed outside and between the housing 20 and the handle 25 in the gap 106. The second housing portion 50, the second handle portion 95, and the insert 125 engage one another in a manner similar to that just described. The second housing portion 50 then attaches to the first housing portion 45 and the second handle portion 95 engages the first handle portion 90 to complete the assembly.

During use, the user positions the shoe 40 on a workpiece and actuates a trigger or otherwise activates the motor 60. The motor 60 drives the interconnecting mechanism 65 that converts the rotary motion of the motor 60 to reciprocating motion of the saw blade 35. The rotating motor 60, interconnecting mechanism 65, and the saw blade 35 interacting with the workpiece produce vibrations at the housing 20. The vibrations move along the housing 20 and pass to the handle 25. However, the slight relative movement provided between the housing 20 and the handle 25 by the insert 125 and the corrugations 104 dissipates the vibrations. In addition, the more flexible rubber-like material used to make the insert 125 helps absorb vibrations.

Various features and advantages of the invention are set forth in the following claims.

I claim:

1. A power tool comprising:

a tool operable to work on a workpiece;

a drive mechanism coupled to the tool and operable to move the tool;

a housing defining an interior, the drive mechanism disposed within the interior;

a handle having a first end and a second end, the first end fixed to the housing, the second end spaced apart from the housing to define a gap therebetween;

an insert fixedly attached to the housing and the second end to fill the gap, the insert being more flexible than the handle and the housing, wherein the housing includes a first engaging portion and the handle includes a second engaging portion each engageable with the insert to substantially fixedly attach the insert to the housing and the handle, and wherein the insert includes a third engaging portion, a fourth engaging portion including an extension, and a plurality of corrugations disposed between the third engaging portion and the fourth engaging portion.

2. The power tool of claim 1, wherein the tool is a reciprocating saw blade.

3. The power tool of claim 1, wherein the drive mechanism includes a motor and is operable to move the tool in a reciprocating fashion.

4. The power tool of claim 1, wherein the housing includes a first portion and a second portion that attach to one another to define the housing.

5. The power tool of claim 1, wherein one of the first engaging portion and the third engaging portion includes a first slot and the other of the first engaging portion and the third engaging portion includes a first rib sized to be received by the first slot.

6. The power tool of claim 5, wherein one of the second engaging portion and the fourth engaging portion includes a second slot and the other of the second engaging portion and the fourth engaging portion includes a second rib sized to be received by the second slot.

7. The power tool of claim 5, wherein the second engaging portion includes a second slot and a pair of pins and the fourth engaging portion includes a second rib sized to engage the second slot and a pair of gussets, each gusset including an aperture sized to receive one of the pair of pins.

8. The power tool of claim 5, wherein the corrugations are disposed within the gap.

9. The power tool of claim 1, wherein the extension includes a slot and the handle includes a projection that is received by the slot such that the projection is movable within the slot.

10. The power tool of claim 1, further comprising a plurality of corrugations formed as part of the handle and the housing and positioned adjacent the first end of the handle.

11. A power tool comprising:

a tool operable to work on a workpiece;

a motor coupled to the tool and operable to move the tool;

a first housing;

a second housing coupled to the first housing to define an interior space, the motor disposed within the interior space;

a handle including a first end fixedly attached to the first housing and a second end spaced apart from the first housing; and an insert fixedly attached to the first housing and the second end, the insert including a first plurality of corrugations, wherein the first housing includes a first engaging portion and the handle includes a second engaging portion each engageable with the insert to substantially fixedly attach the insert to the first housing and the handle, and wherein the insert includes a third engaging portion, a fourth engaging portion including an extension, and wherein the first plurality of corrugations is disposed between the third engaging portion and the fourth engaging portion.

12. The power tool of claim 11, wherein one of the first engaging portion and the third engaging portion includes a first slot and the other of the first engaging portion and the third engaging portion includes a first rib sized to be received by the first slot.

13. The power tool of claim 12, wherein one of the second engaging portion and the fourth engaging portion includes a second slot and the other of the second engaging portion and the fourth engaging portion includes a second rib sized to be received by the second slot.

14. The power tool of claim 12, wherein the second engaging portion includes a second slot and a pair of pins and the fourth engaging portion includes a second rib sized to engage the second slot and a pair of gussets, each gusset including an aperture sized to receive one of the pair of pins.

15. The power tool of claim 11, wherein the extension includes a slot and the handle includes a projection that is received by the slot such that the projection is movable within the slot.

16. The power tool of claim 11, wherein the first plurality of corrugations is disposed within a gap defined between the second end and the first housing.

17. The power tool of claim 11, further comprising a second plurality of corrugations formed as part of the first housing and the handle and positioned adjacent the first end of the handle.

* * * * *